United States Patent
Monnier et al.

(10) Patent No.: US 7,754,931 B2
(45) Date of Patent: Jul. 13, 2010

(54) PRODUCTION OF HIGH-CETANE DIESEL FUEL FROM LOW-QUALITY BIOMASS-DERIVED FEEDSTOCKS

(75) Inventors: Jacques Monnier, Ottawa (CA); Michio Ikura, Ottawa (CA); Guy Tourigny, Gatineau (CA)

(73) Assignee: Her Majesty the Queen in right of Canada as represented by the Minister of Natural Resources, Ottawa, Ontario (CA)

(*) Notice: Subject to any disclaimer, the term of this patent is extended or adjusted under 35 U.S.C. 154(b) by 1294 days.

(21) Appl. No.: 11/234,175

(22) Filed: Sep. 26, 2005

(65) Prior Publication Data
US 2007/0068848 A1    Mar. 29, 2007

(51) Int. Cl.
C10L 1/08    (2006.01)
C10G 69/06    (2006.01)

(52) U.S. Cl. .................. 585/240; 44/300; 44/308; 585/14; 208/15

(58) Field of Classification Search .......... 208/15, 208/58; 44/308; 585/240
See application file for complete search history.

(56) References Cited

U.S. PATENT DOCUMENTS

| | | | | |
|---|---|---|---|---|
| 3,775,293 | A | 11/1973 | Watkins | 208/86 |
| 4,201,659 | A | 5/1980 | Kwant et al. | 208/73 |
| 4,530,753 | A | 7/1985 | Shiroto et al. | 208/68 |
| 4,530,754 | A | 7/1985 | Shiroto et al. | 208/68 |
| 4,652,686 | A | 3/1987 | Coenen et al. | 585/240 |
| 4,982,027 | A | 1/1991 | Korff et al. | 585/24 |
| 4,992,605 | A | 2/1991 | Craig et al. | 585/240 |
| 5,233,109 | A | 8/1993 | Chow | 585/241 |
| 5,578,090 | A * | 11/1996 | Bradin | 44/308 |
| 5,705,722 | A * | 1/1998 | Monnier et al. | 585/240 |
| 5,972,057 | A | 10/1999 | Hayafuji et al. | 44/388 |
| 6,013,114 | A * | 1/2000 | Hille et al. | 44/308 |
| 6,015,440 | A | 1/2000 | Noureddini | 44/388 |
| 6,364,917 | B1 * | 4/2002 | Matsumura et al. | 44/301 |
| 7,201,837 | B2 * | 4/2007 | Stewart et al. | 208/14 |
| 7,232,935 | B2 | 6/2007 | Jakkula et al. | |
| 7,247,232 | B2 * | 7/2007 | Stewart et al. | 208/14 |
| 7,279,018 | B2 * | 10/2007 | Jakkula et al. | 44/301 |
| 2004/0055209 | A1 | 3/2004 | Jakkula et al. | 44/301 |
| 2004/0230085 | A1 | 11/2004 | Jakkula et al. | 585/240 |
| 2006/0161032 | A1 | 7/2006 | Murzin et al. | |

(Continued)

OTHER PUBLICATIONS

Catalytic Hydrotreating of Biomass-Derived Oils Author(s): Eddie G. Baker and Douglas C. Elliott Source: American Chemical Society Year: 1988 Chapter 21 pp. 228-240.

(Continued)

*Primary Examiner*—Ellen M McAvoy

(57) ABSTRACT

A method is taught for producing diesel fuels of high cetane value from a triglyceride feedstock, comprising pretreating the triglyceride feedstock by thermal cracking to partially convert the triglycerides and produce a middle distillates stream, and catalytically hydrotreating the middle distillate fraction to produce high cetane value diesel fuels. A biomass-derived diesel fuel is also taught having sulphur content below 10 ppm, a cetane-value of at least 70, a cloud point below 0° C. and a pour point of less than −4° C. A blended diesel fuel is also taught comprising 5 to 20 vol. % of the biomass-derived diesel fuel of the present invention and 80 to 95 vol. % of a petroleum diesel, based on total volume of the blended diesel fuel.

18 Claims, 1 Drawing Sheet

U.S. PATENT DOCUMENTS

| | | |
|---|---|---|
| 2006/0207166 A1 | 9/2006 | Herskowitz et al. ............ 44/385 |
| 2006/0264684 A1 | 11/2006 | Petri et al. .................. 585/250 |
| 2007/0006523 A1 | 1/2007 | Myllyoja et al. |
| 2007/0010682 A1 | 1/2007 | Myllyoja et al. |
| 2007/0131579 A1 | 6/2007 | Koivusalmi et al. |
| 2007/0135316 A1 | 6/2007 | Koivusalmi et al. |
| 2007/0135663 A1 | 6/2007 | Aalto et al. |
| 2007/0135666 A1 | 6/2007 | Koivusalmi et al. |
| 2007/0135669 A1 | 6/2007 | Koivusalmi et al. |
| 2007/0137097 A1 | 6/2007 | Ikura |
| 2007/0144060 A1 | 6/2007 | Ikura |
| 2007/0161832 A1 | 7/2007 | Myllyoja et al. |

OTHER PUBLICATIONS

Hydrotreating Biomass Liquids to Produce Hydrocarbon Fuels Author(s): Douglas C. Elliott and Eddie G. Baker Source: Energy from Biomass and Wastes Year: 1987 pp. 765-784.

Catalytic Conversion of Vegetable Oils to Diesel Additives Author(s): Mark Stumborg, Douglas Soveran, Wayne Craig, Wayne Robinson and Kung Ha Source: Biotechnology and Applied Biochemistry Year: 1998 pp. 721-738.

Biomass Oil Analysis: Research Needs and Recommendations Author(s): K. Shaine Tyson, Joseph Bozell, Robert Wallace, Eugene Petersen, and Luc Moens Source: NREL National Renewable Energy Laboratory Year: Jun. 2004 pp. viii, ix, 27, 31-34, 42-42, 43, 47, 55, 56, 62-67.

First Biomass Conference of the Americas: Energy, Environment, Agriculture, and Industry Source: NREL National Renewable Energy Laboratory Year: Aug. 30-Sep. 2, 1993 vol. I pp. iii, v-xv.

Industrial Products—The Return to Carbohydrate-Based Industries Author(s): Ariel Louwrier Source: Biotechnology and Applied Biochemistry Year: 1998 vol. 27 pp. 1-7.

Liquid Fuels by Low-Severity Hydrotreating of Biocrude Author(s): D. C. Elliott and G. G. Neuenschwander Source: Developments in Thermochemical Biomass Conversion Year: 1996 vol. 1 pp. 611-621.

Knight, W.N.N. and Peniston-Bird, M.L., 1973, "Cracking and Reforming", Modern Petroleum Technology, 4$^{th}$ edition, Applied Science Publishers Ltd., pp. 278-279.

Farrauto, Robert J. And Bartholomew, Calvin H., "Petroleum Refining and Processing", Fundamentals of Industrial Catalytic Processes, Blackie Academic & Professional, p. 523.

\* cited by examiner

PRODUCTION OF HIGH-CETANE DIESEL FUEL FROM LOW-QUALITY BIOMASS-DERIVED FEEDSTOCKS

FIELD OF THE INVENTION

The present invention relates to a two-step method for producing diesel fuel having a high cetane value from low quality biomass-derived feedstocks.

BACKGROUND OF THE INVENTION

In recent years, the area of biomass-derived diesel fuels has drawn a great deal of attention. These fuels are plant and animal based and are produced from such sources as canola, corn, soybean etc. Biomass-derived fuels are generally environmentally less damaging to use than traditional fossil fuels.

Another potential source for biomass-derived diesel fuels is from the waste greases of animal rendering facilities and waste cooking oils, such as those found as restaurant trap greases. However these waste greases and oils tend to contain contaminants that must effectively be removed before processing.

In the past, catalytic hydrotreating has been performed on triglyceride feedstocks in an attempt to produce high-cetane diesel fuels. Examples of such processes can be seen in U.S. Pat. Nos. 5,705,722 and 4,992,605, herein incorporated by reference. The cetane value of a diesel fuel is a measure of how easily the fuel will auto-ignite at predetermined pressure and temperature and is often used to determine fuel quality. However, large quantities of hydrogen are required for this process, which is a major operating cost in the production of biomass-derived diesel fuel by catalytic hydrotreating. Reducing the volume of hydrogen consumed in the process would make the process economics more favourable. As well, hydrotreating was found to work best for very high quality feedstocks, such as tallow, vegetable oils (canola oil, soya oil, etc.) and yellow grease. Lower quality feedstocks, such as restaurant trap grease were found to be difficult to convert by catalytic hydrotreating, due to their heterogeneous nature and the presence of contaminants. These contaminants were found to rapidly deactivate the catalyst, thereby reducing hydrotreating reactor time on stream, requiring large quantities of catalyst to be used, and increasing operating costs. There is therefore a great need to find efficient methods of producing a high cetane value product from low quality waste triglyceride feedstocks, such as restaurant trap greases and other waste greases, which can be used as a diesel fuel or as diesel fuel blending stock. There is also a need to find efficient methods to reduce hydrogen consumption in the catalytic hydrotreating stage.

SUMMARY OF THE INVENTION

The present invention thus provides a method of producing diesel fuels of high cetane values from triglyceride feedstocks, comprising pretreating the triglyceride feedstocks by thermal cracking to partially convert the triglycerides and produce a middle distillates stream, and catalytically hydrotreating the middle distillate fraction to produce high cetane value diesel fuels.

The present invention also provides a biomass-derived diesel fuel having sulphur content below 10 ppm, a cetane-value of at least 70, a cloud point below 0° C. and a pour point below −4° C.

In yet another embodiment, the present invention provides a blended diesel fuel comprising 5 to 20 vol. % of the biomass-derived diesel fuel of the present invention and 80 to 95 vol. % of a petroleum diesel, based on total volume of the blended diesel fuel.

BRIEF DESCRIPTION OF THE DRAWINGS

The present invention will now be described in further detail with reference to the following drawings, in which.

DEFINITIONS

Figure 1:
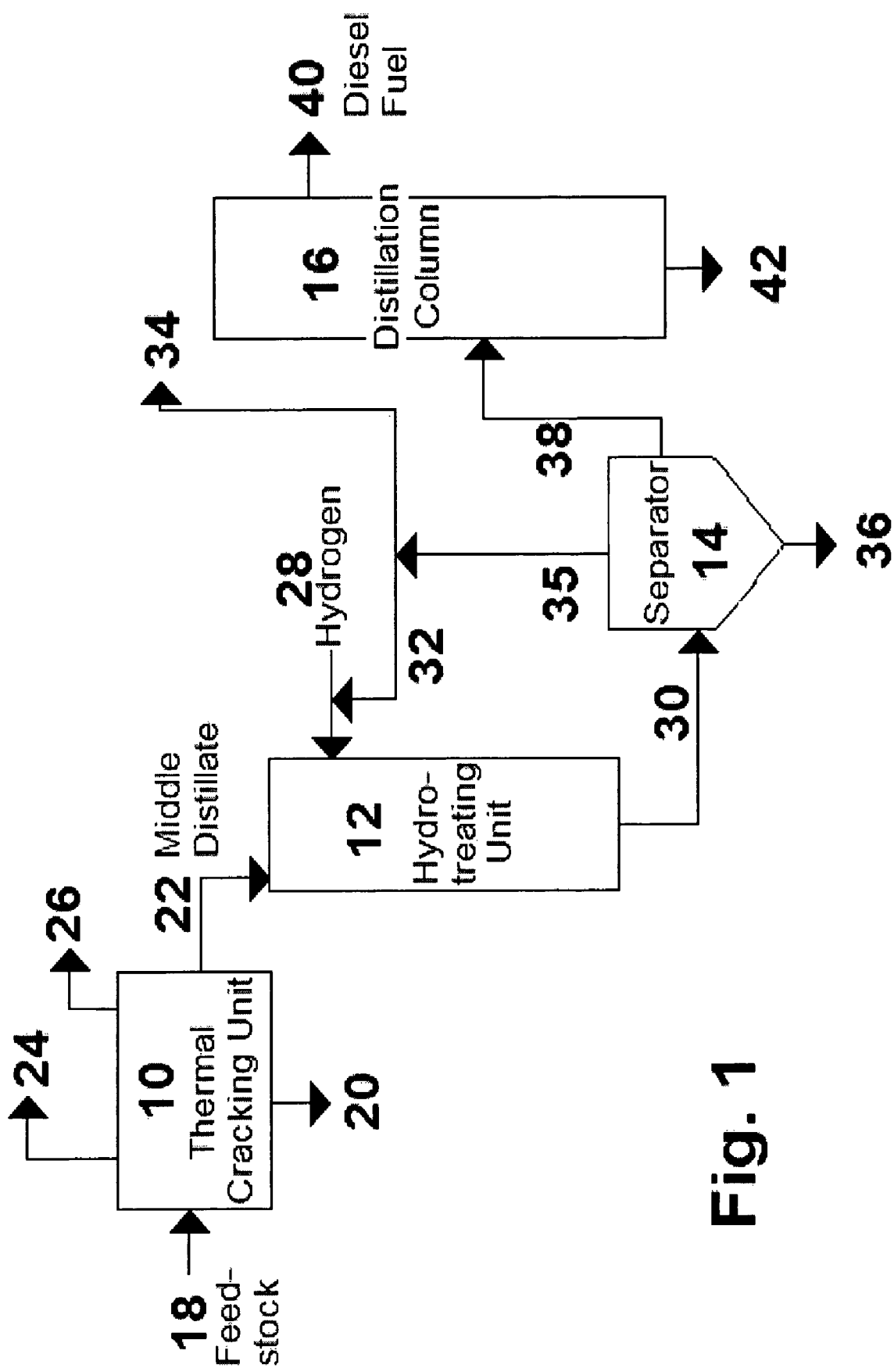
FIG. 1 is a flow sheet of a preferred process for carrying out the present invention.

Biomass-derived diesel fuel—a diesel fuel produced by catalytic hydrotreating of biomass feedstocks and containing practically no oxygen.

Biodiesel—a diesel fuel produced from the transesterification of biomass-derived oils with alcohol and containing oxygen.

Cetane number—measure of the ignition quality of diesel fuel obtained by comparing it to reference fuels or blends of reference fuels of known cetane number in a standardized engine test. The reference fuels are n-cetane, having good ignition quality (CN=100), and heptamethylnonane, having poor ignition quality (CN=15).

High cetane value—for the purposes of the present invention a high cetane value is defined as a value of at least 70.

Waste triglyceride feedstock—a triglyceride from waste sources such as restaurant trap grease, waste from animal rendering facilities and other waste oil and grease sources, generally having at least some contaminants.

Catalytic hydrotreating—a refinery process for catalytically converting and removing sulphur, nitrogen and oxygen from fuels and fuel feedstocks at elevated hydrogen pressures and appropriate temperatures.

Middle distillates—encompass a range of petroleum fractions from kerosene to lubricating oil and include light fuel oils and diesel fuel, generally having a boiling point in the range of 150 to 345° C.

Thermal cracking—the process of breaking down large hydrocarbon molecules into smaller molecules under high temperature and pressure.

Cloud point—a measure of the ability of a diesel fuel to operate under cold weather conditions. Defined as the temperature at which wax first becomes visible when diesel fuel is cooled under standardized test conditions.

Pour point—the lowest temperature at which a fuel flows, when cooled under standardized test conditions. Generally taken to be 3° C. (5.4° F.) or 1° C. (1.8° F.) (depending on selected temperature interval) above the temperature of the no-flow point at which a test vessel of fuel shows no movement when applying a controlled burst of nitrogen gas onto the specimen surface (ASTM D 5949).

DETAILED DESCRIPTION OF THE PREFERRED EMBODIMENTS

The present process employs a novel combination of thermal cracking followed by catalytic hydrotreating to convert low quality triglycerides feedstock into usable biomass-derived diesel fuel. In the present process, thermal cracking is used as a pre-treatment step before catalytic hydrotreating, to partially break down the triglycerides into lower molecular weight components and fatty acids, which can then easily be hydrotreated to produce a diesel fuel having a high cetane value and low sulphur content.

A flow diagram of the process steps and streams of a one embodiment of the present invention is shown in FIG. 1. A feedstock 18 of low quality triglycerides is fed to thermal cracking unit 10. The feedstock 18 can be any variety of waste biomass, including restaurant trap greases, waste greases from animal rendering facilities and other forms of waste oils and greases and low-quality vegetable oils. Preferably, the feedstock 18 is restaurant trap grease and other low-quality feedstocks. The feedstock stream 18 can be heterogeneous in nature and can contain water, carbon particles and have oxygen content as high as 14 wt. % or more.

In the thermal cracking unit 10, the feedstock 18 is partially converted into a mixture of fatty acids and lower molecular weight hydrocarbons. Thermal cracking is preferably carried out under mild cracking conditions which are defined as preferably an operating temperature in the range of from 390 to 460° C., more preferably from 410 to 430° C., and preferably an operating pressure of from 0 to 415 kPa, more preferably from 205 to 275 kPa. Thermal cracking produces various fractions including gases 24, naphtha plus water 26, middle distillate 22, and residue 20.

In an optional embodiment (not shown), the triglyceride feedstock may be filtered to remove any macroscopic contaminant particles.

The middle distillate stream 22 makes up more than half of the thermally cracked product and has been found to have suitable characteristics for further hydrotreating. Middle distillates typically encompass a range of petroleum equivalent fractions from kerosene to lubricating oil and include light fuel oils and diesel fuel. In one embodiment of the present invention the middle distillates were found to have a boiling point range of from 150 to 345° C., and more preferably from 165 to 345° C. The middle distillates fraction was found to contain as much as 40% less oxygen than the starting triglycerides feedstock 18, resulting in less hydrogen being required in the subsequent hydrotreating step.

The middles distillate stream 22 is fed to a catalytic hydrotreating unit 12 containing a catalyst to facilitate and enhance the hydrotreating process. This catalyst is a commercial hydrotreating catalyst such as, for example, nickel-molybdenum, cobalt-molybdenum or nickel-tungsten on a catalyst support. It is preferably a supported nickel-molybdenum catalyst. Known methods in the art can be used to maintain activation of the catalyst, thereby lengthening the useful life of the catalyst.

Hydrogen 28 is also fed to the hydrotreating unit 12. The present inventors have found that, by partially removing oxygen from the feed in the thermal cracking pre-treatment stage, hydrogen consumption in the hydrotreating step decreases significantly. Typical hydrogen consumption for hydrotreatment of clean, high quality biomass feedstock, without thermal cracking, is in the range of 2.3 to 3.0 kg $H_2$ per 100 kg of feedstock. By contrast, hydrogen consumption during hydrotreating of the thermally cracked middle distillates stream 22 is only between 1.5 to 2.0 kg $H_2$ per 100 kg of middle distillate feed 22 to the hydrotreating unit 12.

It has also been observed that, when processing thermally cracked waste triglycerides, hydrotreating can be conducted at lower temperatures than those required for clean, high quality biomass feedstock. Hydrotreating temperatures in the range of 330 to 400° C., and more preferably 350 to 390° C., are used in the present invention, compared to at least 375° C. typically required for hydrotreating uncracked, clean biomass-derived feedstocks.

Hydrotreated product 30 can optionally then be fed to a separator 14 in which the product 30 is separated into a gas stream 35, a water stream 36 and a liquid organic product stream 38. The gas stream 35 can be recycled back to the hydrotreating unit 12 as a hydrogen recycle stream 32, or it can form a fuel gas by-product stream 34.

In a preferred embodiment, the separated liquid organic product stream 38 is fed to a distillation column 16 to further separate diesel fuel 40 from any paraffinic residues 42.

Naphtha 26 and gases 24 from the thermal cracking unit 10 and fuel gas 34 from the hydrotreating step can optionally be sold as valuable by-products. The residue streams 20 and 42 are small and can be discarded by well known means in the art. Stream 42 is much cleaner than stream 20 and can also possibly be used as feedstock for petrochemical applications.

Catalytic hydrotreatment of the middle distillate stream 22 produces a biomass-derived diesel fuel having a cetane value of from 75 to 80 and sulphur content below 10 ppm. Oxygen content of the resultant diesel fuel, an indication of the extent of conversion of the feedstock to diesel fuel, was found to be in the range of 0.09 wt % or less, on the basis of the weight of product diesel.

The biomass-derived diesel fuel of the present invention also exhibits excellent cold-flow properties. The cloud point of the fuel is as low as −1.4 to −2.5° C. and the pour point is −4° C. or less.

In a further embodiment, the biomass-derived diesel fuel of the present invention can be used as diesel blending stock to produce a high cetane value blended diesel fuel. Preferably the blended diesel fuel comprises 5 to 20 vol. % of the biomass-derived diesel fuel of the present invention and 80 to 95 vol. % petroleum diesel, based on a total volume of the blended diesel fuel. More preferably, the blended diesel fuel comprises 10 vol. % of the biomass-derived diesel fuel of the present invention and 90 vol. % petroleum diesel, based on a total volume of the blended diesel fuel. The cetane value of the blended diesel fuel was found to be proportional to the quantities of biomass-derived diesel and petroleum diesel used in the blend and was generally higher than typical values of 40 to 50 for standard petroleum diesel. Cold flow properties of such a blended diesel fuel are improved by the addition of petroleum diesel and are superior to those of the biomass-derived diesel fuel alone.

The following examples better illustrate the process of the present invention:

Example 1

Conversion of Restaurant Trap Grease into Biomass-Derived Diesel

Restaurant trap grease having an average density of 0.925 g/mL, and an oxygen content of 13.72 wt % was fed to a thermal cracking unit where it was cracked at a temperature of 418.5° C. and a pressure of 300 kPa for 40 minutes. Thermal cracking produced a gas stream, a naphtha stream, a middle distillate stream having a boiling point in the range of from 165 to 345° C., water and residue. The middle distillates stream made up 63.0 wt % of the total cracked product and its oxygen content was only 7.99 wt %.

The middle distillate stream was then fed to a catalytic hydrotreating unit. Hydrotreating produced a biomass-derived diesel fuel having a cetane value of 75.4, a pour point of −6.0° C. and a cloud point of −2.5° C. The diesel was found to have less than 10 ppm sulphur content, which is well within tolerable commercial limits.

Example 2

Conversion of Yellow Grease into Biomass-Derived Diesel

Yellow grease is waste grease resulting for rendering of animal fat. In this case, yellow grease, having a density of 0.918 g/mL and an oxygen content of 11.56 wt. % was fed to a thermal cracking unit in which it was cracked at 411° C. and 100 kPa for 40 minutes. Thermal cracking produced a product containing 68.6 wt % middle distillates (165° C.-345° C.), 7.0 wt % naphtha and the remainder gas, water and residues.

The middle distillate stream, which was found to have 8.29 wt % oxygen, was then fed to a catalytic hydrotreating unit. The resultant biomass-derived diesel stream had a cetane value of 79.2, a pour point of −4.0° C. and a cloud point of −1.4° C. The sulphur content of the diesel was found to be less than 10 ppm.

This detailed description of the process and methods is used to illustrate one embodiment of the present invention. It will be apparent to those skilled in the art that various modifications can be made in the present process and methods and that various alternative embodiments can be utilized. Therefore, it will be recognized that various modifications can also be made to the applications to which the method and processes are applied without departing from the scope of the invention, which is limited only by the appended claims.

The invention claimed is:

1. A method of producing diesel fuels of high cetane value from a triglyceride feedstock, comprising:
   a. pretreating the triglyceride feedstock by thermal cracking to partially convert the triglycerides and produce a middle distillates fraction; and subsequently
   b. catalytically hydrotreating the middle distillate fraction to produce high cetane value diesel fuels.

2. The method of claim 1 wherein the triglycerides feedstock is selected from the group consisting of restaurant trap grease, animal fats, waste greases, low-quality vegetable oils and combinations thereof.

3. The method of claim 1 wherein the middle distillates have a boiling point in the range of from 160° C. to 345° C.

4. The method of claim 1 wherein thermal cracking is conducted at a temperature in the range of from 390° C. to 460° C.

5. The method of claim 1 wherein thermal cracking is conducted at a temperature in the range of from 410° C. to 430° C.

6. The method of claim 1 wherein catalytic hydrotreating consumes less than 2.0 kg of hydrogen per 100 kg of middle distillate fed to the hydrotreating step.

7. The method of claim 1 wherein catalytic hydrotreating is conducted at a temperature of from 330° C. to 400° C.

8. The method of claim 6 wherein catalytic hydrotreating is conducted at a temperature of from 350° C. to 390° C.

9. The method of claim 1 wherein catalytic hydrotreating is conducted using a commercial hydrotreating catalyst.

10. The method of claim 9 wherein the commercial hydrotreating catalyst is nickel-molybdenum, cobalt-molybdenum or nickel-tungsten on a catalyst support.

11. The method of claim 1, further comprising filtering the triglyceride feedstock to remove macroscopic contaminant particles before thermal cracking.

12. The method of claim 1, further comprising conducting separation after catalytic hydrotreating to produce a gas stream, a water stream and a liquid organic product stream.

13. The method of claim 12, further comprising distilling the liquid organic product stream to further separate diesel fuels from paraffinic residues.

14. The method of claim 12, further comprising the step of recycling the gas stream as hydrogen recycle during catalytic hydrotreating.

15. A biomass-derived diesel fuel having a cetane-value of at least 70, a cloud point below 0° C. and a pour point of less than −4° C., produced by the process of claim 1.

16. A blended diesel fuel comprising 5 to 20 vol. % biomass-derived diesel fuel as described in claim 15 and 80 to 95 vol. % petroleum diesel, based on a total volume of the blended diesel fuel.

17. A blended diesel fuel comprising 10 vol. % biomass-derived diesel fuel as described in claim 15 and 90 vol. % petroleum diesel, based on a total volume of the blended diesel fuel.

18. The diesel fuel of claim 15, having a sulphur content of below 10 ppm.

\* \* \* \* \*